Dec. 24, 1940.   G. OGDEN   2,226,101
MANUFACTURE OF AMMONIUM SULPHATE
Filed May 26, 1939
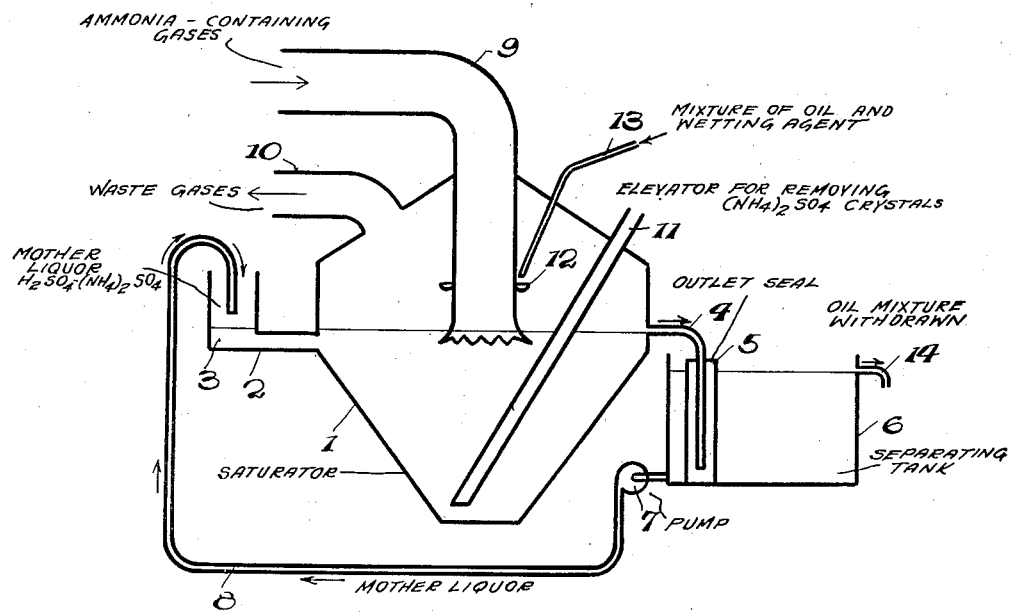

Patented Dec. 24, 1940

2,226,101

UNITED STATES PATENT OFFICE 2,226,101

MANUFACTURE OF AMMONIUM SULPHATE

Geoffrey Ogden, Norton-on-Tees, England, assignor to Imperial Chemical Industries Limited, a corporation of Great Britain Application May 26, 1939, Serial No. 276,004
In Great Britain May 30, 1938

5 Claims. (Cl. 23—119)

This invention relates to the manufacture of ammonium sulphate by the saturator process in which ammonia or ammonia-containing gas is passed into a bath containing a solution of ammonium sulphate and sulphuric acid.

In processes of this type, difficulty is experienced in producing satisfactorily white crystals of ammonium sulphate, due to the presence of impurities which are present in the original acid and also in the ammonia gases when these are obtained from coke oven plants, especially when the direct or semi-direct methods of by-product recovery are employed. The acid fed to the saturator often contains iron, arsenic, lead and copper and these tend to be removed either in the ammonium sulphate crystals themselves or adhering to their surface, and so give them a dirty appearance. The ammonia gases from coke oven plants also contain tarry matter which tends to cling to the ammonium sulphate crystals formed in the saturator and so discolour them.

Addition of creosote to the saturator liquor has already been practised and in several instances has led to an improvement in the colour of the ammonium sulphate.

This invention has as an object to devise a new method of manufacturing ammonium sulphate. A further object is to devise a new method of manufacturing ammonium sulphate which will give crystals of much improved whiteness. Further objects will appear hereinafter. These objects are accomplished by the following invention.

I have now found that ammonium sulphate crystals of much improved whiteness can be produced by introducing an oil and a wetting agent into the liquor in the saturator, subsequently allowing liquor from the saturator to settle so that the creosote in it rises to the surface, and removing the creosote.

The accompanying drawing illustrates one method of putting the invention into practice. Referring to the drawing, 1 is the saturator which is fed with the mother liquor of sulphuric acid and ammonium sulphate through the pipe 2 from the tank 3. The mother liquor is drawn off through pipe 4 into the seal pot 5, which is maintained full of liquid to ensure that no ammonia escapes through pipe 4 and from which it overflows into the tank 6. From the tank 6 the pump 7 and the pipe 8 carry the mother liquor back to the tank 3 where the necessary make-up acid is added. The ammonia-containing gases are introduced through the broad pipe 9 and waste gases pass out by the pipe 10. The ammonium sulphate crystals when formed drop to the bottom of the saturator 1 and are removed by the elevator 11. Around the pipe 9 is placed a small annular trough to which is fed by means of pipe 13 the mixture of oil (for example, creosote oil) and wetting agent. The rate of flow is kept slow at first and steadily increases until the crystals on the elevator 11 show a consistent white colouration. The flow of creosote oil and wetting agent through 13 is then kept constant and flows into the trough 12 from which it overflows evenly into the mother liquor below. Eventually it is drawn off with the mother liquor by pipe 4, seal pot 5, into tank 6 where it separates out, rises to the surface and is withdrawn by pipe 14 for purification.

The wetting agent must be such that it is not decomposed by the acid in the mother liquor. Wetting agents such as stearates and oleates of sodium and potassium are, therefore, not suitable, but wetting agents having a sulphonic group can in general be used.

The oil may be introduced into the saturator in any convenient manner. It may, for example, be introduced with the make-up acid, or introduced into the mother liquor system, at the overflow from the draining table, at the mother liquor return from the centrifuge, to the feed of mother liquor from the mother liquor well to the saturator, or to the water used to wash the crystals prior to its entry into the mother liquor system.

The wetting agent may be added with the creosote oil or separately at any convenient point in the mother liquor system as in the case of the creosote oil.

The settling of the liquor and the separation of the creosote oil may be carried out in the mother liquor well or a special settling tank may be provided to treat the liquor overflowing the draining table or that returning from the centrifuge. Alternatively, a purge from the saturator may be made to a settling tank and the clear liquor free from creosote returned directly to the saturator. Other means of removing the creosote will be evident, the essential factor being that the creosote after addition to the mother liquor must pass through the saturator before being separated from the liquor.

It is believed that the creosote carries tarry and mineral impurities with it to the surface in the settling tank, and these are thereby prevented from accumulating in the mother liquor and discolouring the ammonium sulphate.

The upper layer of creosote is preferably removed at frequent intervals, but it is possible to allow it to build up, for example, in the mother liquor well until further accumulation would inconveniently reduce the stock of mother liquor, and then remove it. It is essential, however, that once the creosote has been through the saturator, it should not be returned to the saturator, unless it has been purified, for example, by distillation, to remove the impurities in it.

The amount of creosote required will vary according to the amount of impurities in the raw materials entering the saturator and the general conditions of working. The amount which is suitable can, however, be easily determined by noting the colour of the crystals produced and adjusting the additions accordingly. There is a danger of adding too much creosote, which will then itself cause discolouration and it is, therefore, advisable to commence by adding a small amount and gradually increasing it until the desired whiteness of the crystals is obtained.

The amount of wetting agent to be used depends upon the amount of impurities in the liquor and the general conditions of working, but in any given instance the required amount can be easily determined by trial as for the creosote oil. Care should be taken not to add too much wetting agent, otherwise the separation of the creosote oil and impurities from the mother liquor may be impaired.

Instead of the creosote oil used above I could have used kerosene oil, an oil of the type generally used in Diesel or compression ignition engines, middle oil or any other stable oil which has a density lower than that of the saturator liquor and which is not appreciably vapourised under the conditions ruling in the saturator.

I could have used any wetting agent having the following properties:

1. High wetting and penetrating power in acid, neutral and alkaline media.
2. Good stability to mineral acids and in concentrated salt solutions.
3. Ready solubility in concentrated salt solutions. I have found that the material sold under the registered Trade-Mark "Calsolene" gives good results.

This invention is a valuable advance in the art as it enables ammonium sulphate crystals to be produced uncontaminated with any impurity.

As many apparently widely different embodiments of this invention may be made without departing from the spirit and scope thereof, it is to be understood that the invention is not limited to the specific embodiments thereof except as defined in the appended claims.

I claim:

1. In the manufacture of ammonium sulphate by the saturator process the step which comprises adding to the liquor in the saturator a mixture of an oil and a wetting agent which will not be attacked by the other compounds present.

2. In the manufacture of ammonium sulphate by the saturator process the step which comprises adding to the liquor in the saturator a mixture of an oil and a wetting agent having a sulphonic group.

3. The step as claimed in claim 1 in which the oil used is a hydrocarbon oil which has a density lower than that of the saturator liquor and which is not appreciably vapourised under the conditions ruling in the saturator.

4. The step as claimed in claim 1 in which the oil used is kerosene oil.

5. The step as claimed in claim 1 in which the oil used is creosote oil.

GEOFFREY OGDEN.